United States Patent

Christiansen et al.

[11] Patent Number: 5,942,287
[45] Date of Patent: *Aug. 24, 1999

[54] EXTENDED WEAR DEVELOPER SLEEVE WITH COUPLING AGENT

[75] Inventors: Robert Arnold Christiansen, Salvisa; Martin Victor Digirolamo; Michelle Kathryn Morris, both of Lexington; Mark Meredith Trayner, Harrodsburg, all of Ky.

[73] Assignee: Lexmark International, Inc., Lexington, Ky.

[ * ] Notice: This patent issued on a continued prosecution application filed under 37 CFR 1.53(d), and is subject to the twenty year patent term provisions of 35 U.S.C. 154(a)(2).

[21] Appl. No.: 09/063,904

[22] Filed: Apr. 21, 1998

[51] Int. Cl.⁶ .................................................. B05D 1/02
[52] U.S. Cl. .................................. 427/388.1; 427/388.5; 427/421
[58] Field of Search .............................. 427/388.5, 388.1, 427/421

[56] References Cited

U.S. PATENT DOCUMENTS

| | | |
|---|---|---|
| 4,623,738 | 11/1986 | Sugerman et al. . |
| 4,989,044 | 1/1991 | Nishimura et al. .................. 355/251 |
| 5,164,780 | 11/1992 | Ohno et al. . |
| 5,175,586 | 12/1992 | Goseki et al. . |
| 5,185,496 | 2/1993 | Nishimura et al. . |
| 5,245,392 | 9/1993 | Behe et al. . |
| 5,274,426 | 12/1993 | Goseki et al. . |
| 5,286,917 | 2/1994 | Unno et al. . |
| 5,325,161 | 6/1994 | Saha et al. . |
| 5,547,724 | 8/1996 | Kuribayashi . |

FOREIGN PATENT DOCUMENTS

| | | |
|---|---|---|
| 1-102485 | 4/1989 | Japan . |
| 4-19761 | 1/1992 | Japan . |
| 07295364 | 11/1995 | Japan . |
| 07295367 | 11/1995 | Japan . |
| 07301985 | 11/1995 | Japan . |
| 07301988 | 11/1995 | Japan . |
| 07301989 | 11/1995 | Japan . |
| 07319272 | 12/1995 | Japan . |
| 07325475 | 12/1995 | Japan . |
| 08160737 | 6/1996 | Japan . |
| 08160738 | 6/1996 | Japan . |
| 08160739 | 6/1996 | Japan . |
| 08185042 | 7/1996 | Japan . |
| 08240981 | 9/1996 | Japan . |
| 08305157 | 11/1996 | Japan . |
| 08305158 | 11/1996 | Japan . |
| 08305171 | 11/1996 | Japan . |

*Primary Examiner*—Katherine A. Bareford
*Attorney, Agent, or Firm*—John A. Brady

[57] ABSTRACT

An extended wear developer sleeve coating formulation that provides optimum print quality for a toner cartridge that prints 30,000 pages. The coating formulation contains an unique coupling agent which acts to chemically bond the graphite material and the phenolic resin components of the formulation together, even at high graphite loads, to increase the cohesive strength of the coating and improve its wear resistance.

4 Claims, 2 Drawing Sheets

EXTENDED WEAR DEVELOPER SLEEVE WITH COUPLING AGENT

BACKGROUND OF THE INVENTION

The invention relates to a developer sleeve or carrying element that has a wear resistant coating that provides optimum print quality for a toner cartridge that prints 30,000 pages.

A developer sleeve is used in an electrophotographic toner cartridge to carry toner to the developing gap. The developer sleeve is comprised of an aluminum core, which may be surface treated, and a coating having a thickness of approximately 5–10 microns. The significance of the coating is to provide 1) the proper surface roughness to carry the toner, 2) the proper electrical conductivity and triboelectric characteristics to charge the toner and 3) to provide a surface that will not allow the toner particles to permanently adhere and thus be free to move within the developing gap.

Various patents have been issued relating to the developer sleeve and specifically the coating. Below is a list of the existing developer sleeve patents.

In U.S. Pat. No. 4,989,044, dated Jan. 21, 1991, there is described a coating that contains a phenolic resin, graphite, and carbon black. The coating was applied to the core to reduce fade to black (low optical density of first developer revolution) and to prevent optical density from decreasing over life. The coating stabilizes the toner charge throughout life and across all environments. In addition, the coating prevents the toner from being deposited on the developer sleeve.

In U.S. Pat. No. 5,164,780, dated Nov. 17, 1992, the surface characteristics (specifically Cv at tp=5%) of the sleeve must be controlled to prevent ghosting. The Cv at tp=5% should be between 0.5 and 5 micrometers. In addition, the surface characteristics of the sleeves may be controlled by polishing the coating after dipped or sprayed on the core.

In U.S. Pat. No. 5,185,496, dated Feb. 9, 1993, the specific surface characteristics necessary to prevent fade to black and ghosting from occurring are described. The average roughness should be between 0.4 and 3 micrometers Ra, the coating thickness should be between 1 and 30 microns and the volume resistivity should be between 0.001 and 100 ohm-cm.

In U.S. Pat. No. 5,274,426, dated Dec. 28, 1993, there is described polishing of the coating layer of the sleeve on the ends different from the middle. This is to prevent fade to black on the printed pages. An alternative to polishing is to use a different coating at the ends of the sleeve versus the middle.

In U.S. Pat. No. 5,286,917, dated Feb. 15, 1994, the surface characteristics of the core should be controlled to between 1.0 and 3.0 micrometers Ra by sandblasting the core. The sandblasted core improves adhesion of the coating to the core, prevents wear, and suppresses a change in the coating surface characteristics throughout the life of printing. Also, this patent shows refining the coating surface characteristics to be an average roughness, Ra, between 0.8 and 2.5 micrometers, the average pit to pit spacing, Sm, to be 30 to 70 micrometers, and the coating layer to be deposited on the core as 4 to 12 g/m2.

Finally, in U.S. Pat. No. 5,547,724, dated Aug. 20, 1996 (JP application priority date of Oct. 2, 1989), there is described adding a spherical polymeric material (PMMA) to the coating to provide a coating whose surface characteristics do not change over a duration of printing a large number of pages. In addition the patent claims that this coating will allow a stable charge to the toner in all environments. The polymeric material is added to a coating of phenolic resin, graphite and/or carbon black.

Based on the listed patents above, and others, coating formulations were used for existing cartridges.

40–60% of solids is natural graphite (specifically 52–57%)

40–60% of solids is phenolic resin (specifically 42–47%)

This formula is shear mixed and milled at a 20–24% solids loading into denatured ethanol. The wet coating is then sprayed onto sandblasted aluminum cores (core Ra between 1.5 and 2.5 micrometers) with a coatweight between 0.15 and 0.30 g and more specifically 0.1 8–0.25 g (for a coating area of approximately 170 cm$^2$). The coating is cured in a convection type oven at between 165° C. and 175° C. for 30 minutes. The finished coating has an Ra between 1.9 and 3.0 micrometers and a Cv at tp=5% of <6 microns. This sleeve, when used with the existing cartridge system, has a coating durability of at least 15,000 pages and an average optical density through the life of a cartridge of between 1.35 and 1.50.

With the market demand for higher speed printing and longer life cartridges, it is an objective of the present invention to produce a developer sleeve that will not only have excellent print quality for the entire life of the cartridge, but also will be able to have a coating that is more durable and resists wearing off of the core. No patents exist that describe a solution for coating wear resistance of this type.

The toner cartridge utilizes a developer sleeve to carry toner on its surface from the toner supply container to the development zone. This sleeve utilizes a coating with a specified roughness and electrical properties to produce the proper mass and charge of the toner. The specified roughness and electrical properties need to be maintained over the life of the toner cartridge in order to maintain the desired print performance. Any change in these characteristics result in print defects such as loss of optical density, poor uniformity of gray scale printing, high levels of background printing, etc.

It is a further object of the present invention to produce a toner cartridge that has a cycle life of 30,000 pages.

SUMMARY OF THE INVENTION

The functional deficiencies of existing cartridges, such as low optical density or coating wear, have led to the present invention. These deficiencies have been solved and the invention takes off where the prior art leaves off.

The problems were solved through the addition of a coupling agent into the coating formulation. The coupling agent acts to chemically bond the graphite material and the phenolic resin together, even at high graphite loads, to increase the cohesive strength of the coating and improve its wear resistance.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
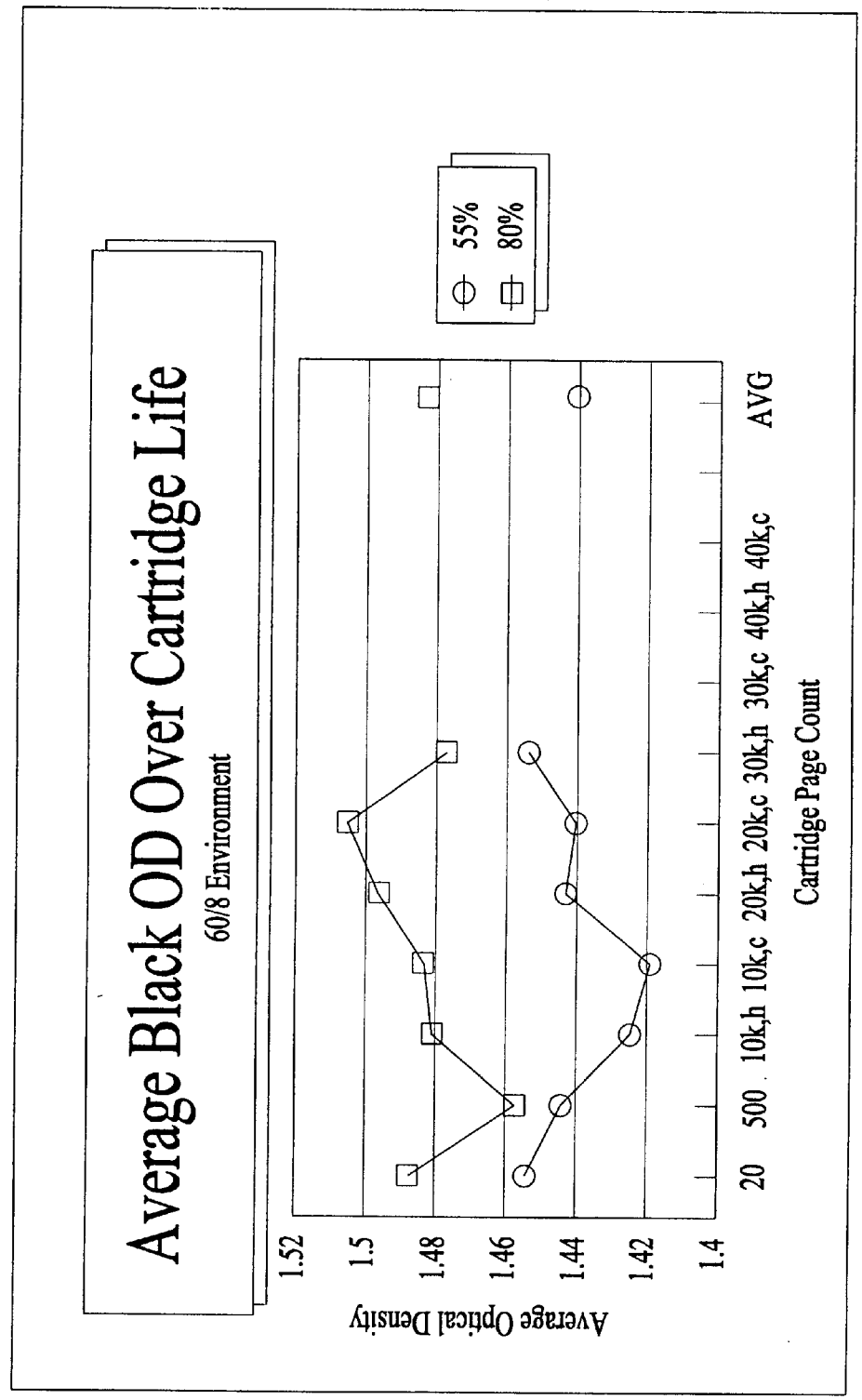
FIG. 1 is a graphical comparison plot of average optical density of two graphite loadings as a function of cartridge life.

The invention focuses on an unique coating formulation which supports a high level of graphite loading within the developer carrying element or sleeve coating to provide good print performance for the developer carrying element. A low graphite loading in the coating formulation produces poor print performance. FIG. 1 is a plot of the performance. The average optical density has been plotted as a function of cartridge life for developer carrying elements with solids graphite loading of 55% (open circles) and 60% (open squares). Each plot or point represents the average performance of four cartridges. Clearly, the higher loading of graphite produces better optical density. Such is achieved without negative print quality consequences.

There is a significant drawback to a higher loading of graphite. As graphite concentration increases, phenolic concentration of a coating formulation decreases. The phenolic resin is the binder which maintains coating integrity and bonds the coating to the developer carrying element or sleeve. As the phenolic resin composition decreases, it loses strength and the coating becomes subject to excessive wear. The wear is cohesive in nature rather than a loss of adhesion to the sleeve or element core. The binder to conductive material ratio results in a tradeoff between good wear performance (i.e. long sleeve life) and good print quality. This problem was solved by the present invention through the use of a novel coupling agent which chemically bonds the graphite and phenolic resin together increasing the cohesive strength of the coating and improving its wear resistance. The coupling agent allows the sleeve or element to have superior print quality (high graphite loading) and good wear resistance (long life).

Figure 2:
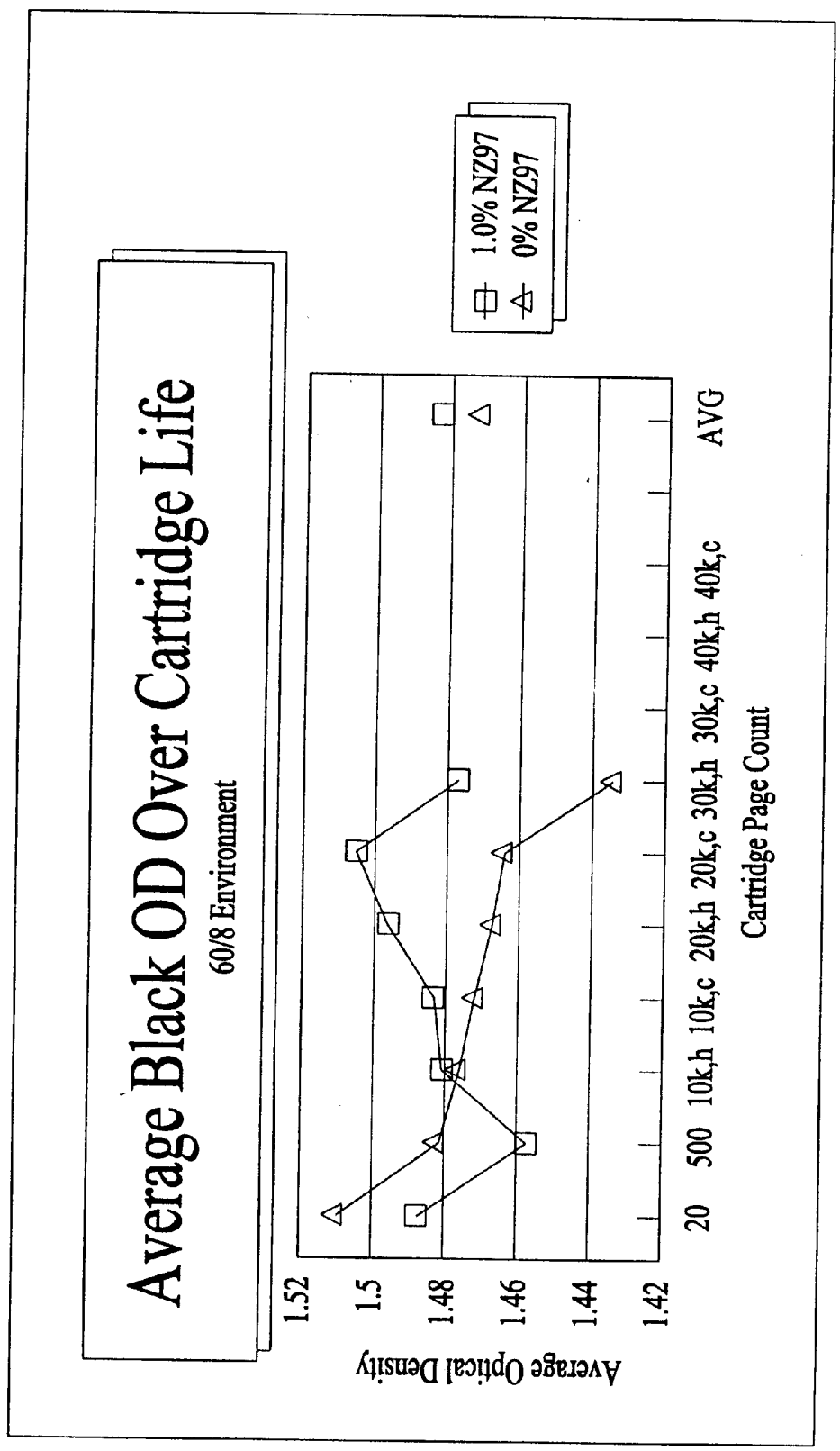
FIG. 2 is a graphical comparison representation of average optical density of two coating formulations as a function of cartridge life.

FIG. 2 is a plot displaying the benefit of the novel coupling agent. The average optical density has been plotted as a function of cartridge life for developer carrying elements or sleeves with graphite loading of 60% with (open squares) and without (open triangles) a zirconate based coupling agent. Each plot or point represents the average performance of four cartridges. Similar optical densities are achieved with both sets of sleeves or elements early in cartridge life but a gradual loss of optical density is observed with the sleeves or elements without the zirconate coupling agent. The loss of optical density is a direct result of the loss of sleeve or element coating due to wear. At the end of life, approximately 25% of the coating wore off the elements or sleeves without the coupling agent while none wore off the sleeves or elements with the zirconate coupling agent.

One embodiment of the inventive formulation, embodying the present invention, includes: a phenolic resin; a conductive flake graphite; a liquid coupling agent to promote adhesion of the phenolic resin to both the substrate (sleeve) and to the filler ingredients; a diluent solvent to bring mixture to preferred solids content for application and optionally, a conductive grade carbon black and/or polymeric microspheres.

A phenolic resin suitable for the unique formulation can be any commercially available precatalyzed resin, unmodified except for the pre-solubilization in a diluent solvent. Other modified phenolic (polyvinylbutyral/phenolic or epoxy/phenolic) or epoxy systems may be equally usefull for the invention. The resin is incorporated in a working range of 35 to 60% by weight based on solids content of the mix, with 35–45% by weight being a preferred embodiment.

The graphite material component is preferably a natural flake, crystalline vein or synthetic graphite system having a flake size ranging from 5 to 20 microns.

Preferred is a crystalline vein natural flake graphite available from Asbury Graphite Company. This material is high grade (high purity) and has a particle size ranging from 7 to 11 microns and has a surface area of 7.4–11.0 $m^2$/gram. The graphite material component is present in an amount ranging from about 40 to about 65% by weight based on solids content of the mix, and preferably from about 55% to about 65% by weight.

The preferred liquid coupling agents are additions that when added to the resin/diluent mixture promote the surface wetting and bonding to the subsequently added filler materials (graphite, etc.) and to the developer sleeve or element body, usually aluminum. The compounds used in extending the cycle life of the inventive developer sleeve body are preferably neo-alkoxy titanate, neo-alkoxy zirconate, and silane based at levels of about 0.5 to about 5.0% by weight of solids in the mixture. A preferred embodiment includes from 0.5 to 3.0% by weight of the coupling agent. Kenrich Petrochemicals, Inc. is a preferred supplier of neo-alkoxy titanates and neo-alkoxy zirconates, specifically LICA 38, and NZ97 respectively. Dow Corning is a preferred supplier of silane coupling agents, specifically Z6124 and Z6020.

The diluent solvent is preferably a denatured ethyl (grain) alcohol to achieve proper sleeve or element roughness (1.0 to 3.0 micrometers Ra, with 1.8 to 2.2 micrometers Ra the preferred embodiment). Adjustment of the final solids content is done with the solvent at the point of coating application (20 to 24%, with 21 to 23% being the preferred embodiment).

Optionally, polymeric microspheres can be included. The polymeric microspheres suitable for the formulation can be selected from a number of candidates, see U.S. Pat. No. 5,547,724. For best performance in enhancing coating wear, the microspheres should be of a diameter at least that of coating film thickness (7–12 microns, 8–11 the preferred embodiment). Polymethylmethacrylate is a preferred polymer. Additionally, molecular weights of 300,000 or higher are preferred as polymers. The preferred embodiment is a microsphere size of 10–12 microns, with 6–20 microns being the acceptable wide range. Esprit Chemical Company is a supplier of the preferred polymeric microspheres.

Optionally, conductive carbon black can be included. High graphite levels that produce optimal print quality can exhibit inadequately resin-wetted and/or filled coatings that are viable and lend themselves to early wear. Wear life is enhanced by higher resin content formulation, but at a penalty in conductivity of the sleeve or element coating and a resultant optical density deficiency. Much of the deficiency can be overcome by lowering the graphite level and replacement with a much lower level of high electrical conductivity, 2–6 micron carbon black. Ranges from about 1 to 5% weight of solids was found to restore optical density to desired levels, with 2–4% by weight being the preferred embodiment.

A specific formula is by weight, 60% graphite; 38% phenolic; and 2% NZ97, zirconate based coupling agent, at 23.5% by weight solids content.

The formulation is produced by shear mixing and milling at a solids loading in the diluent solvent the phenolic resin, the graphite filler, the coupling agent, and, if desired, the polymeric microspheres and/or carbon black. The resulting wet coating formulation is sprayed onto an aluminum core, sleeve or element. After application, the coating is cured at a temperature from 170° C. to 190° C. for 30–120 minutes in an oven.

The above-described formula improves print quality and allows the coating to withstand 30,000 pages without wear. In addition, the durable coating can be sprayed directly onto an aluminum core that has not been grit blasted. The only requirement for the core is that it is washed prior to coating. The removal of grit blasting is a further cost saving in the manufacturing process of the patent.

While the invention has been described with reference to the formulations disclosed herein, it is not confined to the details set forth and this application is intended to cover such modifications or changes as may come within the purposes of the improvements or the scope of the following claims.

What is claimed is:

1. A process for coating a developer sleeve with a coating formulation comprising by weight 38 percent of solid content of a phenolic resin, 60 percent of solid percent of solid content of a graite material, 2 percent of solid content of a zirconate based coupling agent, and a diluent solvent, said process comprising the steps of:

a. shear mixing and milling said phenolic resin, said graphite materials, and said coupling agent in said diluent solvent in a solid loadings ratio of about 20 to about 24% by weight to form a wet coating material;

b. spraying said set material onto said developer sleeve to a coatweight ranging from about 0.15 to about 0.30 g, for a coating area of approximately 170 cm$^2$ to form a wet sprayed coating layer; and c. curing said wet sprayed coating layer in an oven having a temperature ranging from about 165° C. to about 190° C. for about 30 minutes to about 120 minutes.

2. The process for coating a developer sleeve with a coating formulation as claimed in claim 1, wherein polymeric microspheres are included in said shear mixing and milling.

3. The process for coating a developer sleeve with a coating formulation as claimed in claim 1, wherein carbon black is included in said shear mixing and milling.

4. The process for coating a developer sleeve with a coating formulation as claimed in claim 1, in which said solid content consists of 38 percent by weight of phenolic resin, 60 percent by weight of graphite materials, and 2 percent by weight coupling agent.

* * * * *